United States Patent
Morishige

(10) Patent No.: US 7,452,295 B2
(45) Date of Patent: Nov. 18, 2008

(54) CHAINS FOR POWER TRANSMISSION

(75) Inventor: Kouji Morishige, Nabari (JP)

(73) Assignee: BorgWarner Morse TEC Japan K.K., Nabari (JP)

(*) Notice: Subject to any disclaimer, the term of this patent is extended or adjusted under 35 U.S.C. 154(b) by 599 days.

(21) Appl. No.: 10/925,322

(22) Filed: Aug. 24, 2004

(65) Prior Publication Data
US 2005/0049099 A1    Mar. 3, 2005

(30) Foreign Application Priority Data
Sep. 3, 2003    (JP)    ............... 2003-311284

(51) Int. Cl.
*F16G 13/02*    (2006.01)
(52) U.S. Cl. ................................ 474/206
(58) Field of Classification Search ........... 474/206, 474/208, 212, 213, 218, 219, 220, 221, 223, 474/233
See application file for complete search history.

(56) References Cited

U.S. PATENT DOCUMENTS

| | | | | |
|---|---|---|---|---|
| 580,449 A * | 4/1897 | Caldwell | ............... | 474/218 |
| 617,716 A * | 1/1899 | Caldwell | ............... | 474/221 |
| 992,740 A * | 5/1911 | Taylor | ............... | 474/221 |
| 1,239,232 A * | 9/1917 | Taylor | ............... | 474/221 |
| 1,933,653 A * | 11/1933 | Bremer | ............... | 474/221 |
| 1,939,986 A * | 12/1933 | Klaucke | ............... | 474/221 |
| 1,947,421 A * | 2/1934 | Mize | ............... | 474/221 |
| 2,130,063 A * | 9/1938 | Bryant | ............... | 474/221 |
| 2,231,380 A * | 2/1941 | Belcher | ............... | 474/221 |
| 2,466,639 A * | 4/1949 | Focke et al. | ............... | 474/220 |
| 2,557,963 A * | 6/1951 | Hapman | ............... | 474/207 |
| 2,638,790 A * | 5/1953 | Perron | ............... | 474/221 |
| 3,351,252 A * | 11/1967 | Singley et al. | ............... | 225/103 |
| 3,353,421 A * | 11/1967 | Ketterle et al. | ............... | 474/215 |
| 6,558,281 B1 * | 5/2003 | Greiter | ............... | 474/219 |
| 6,824,484 B2 * | 11/2004 | Greiter | ............... | 474/201 |

FOREIGN PATENT DOCUMENTS

| | | | |
|---|---|---|---|
| DE | 3048797 A | * | 7/1982 |
| JP | 55-34580 | | 8/1953 |
| JP | 06033993 A | * | 2/1994 |
| JP | 07317845 A | * | 12/1995 |

* cited by examiner

*Primary Examiner*—Vicky A Johnson
(74) *Attorney, Agent, or Firm*—Brown & Michaels, PC

(57) ABSTRACT

A silent chain includes a plurality of inside links each having a pair of teeth and pin apertures and connected to each other by connecting pins inserted into the pin apertures. At least three adjacent connecting pins have a wire extending substantially along the length of a chain. The wire is engaged with the connecting pins in such a way that bending resistance due to elastic deformation of the wire is applied to the chain during articulation of the chain.

20 Claims, 5 Drawing Sheets

(a)

(b)

(c)

CHAINS FOR POWER TRANSMISSION

REFERENCE TO RELATED APPLICATIONS

This application claims an invention which was disclosed in Japanese application number 2003-311284, filed Sep. 3, 2003, entitled "CHAINS FOR POWER TRANSMISSION". The benefit under 35 USC §119(a) of the Japanese application is hereby claimed, and the aforementioned application is hereby incorporated herein by reference.

BACKGROUND OF THE INVENTION

1. Field of the Invention

The invention pertains to the field of power transmission chains. More particularly, the invention pertains to an improvement in the structure of a chain for restraining chordal oscillation of a chain.

2. Description of Related Art

A power transmission chain for use in an automobile or motorcycle is generally constructed from multiple links that are connected endlessly by connecting pins inserted into pin apertures of the links. In operation of a power transmission chain, when the engagement frequency, determined by the number of teeth and the rotational speed of a sprocket around which a chain is wrapped, coincides with resonance frequency of a chain, determined by the length of a chain span and chain tension, resonance occurs in the chain span and the span oscillates severely in a lateral direction.

Various efforts have been made to prevent such resonant oscillation of a chain span. For example, FIGS. 4 and 5 of Japanese patent application laid-open publication No. 55-34580 show that two adjacent connecting pins of two adjacent links are coupled to each other via a leaf spring in order to decrease the engagement collision sound of a roller chain.

Japanese reference 55-34580 describes that the links articulate against the spring force of a leaf spring at the time of articulating motion of the adjacent links thereby restraining rapid articulation of the links at the engagement with the sprocket teeth to decrease the engagement collision sound. Also, in this case, chordal oscillation of a chain span may also be restrained due to restriction of articulating motion of the links.

However, in the prior art structure, since opposite end portions of the leaf spring need to be fixedly attached to the end portions of the connecting pins, the end portions of the connecting pins require caulking, thereby making the assembly work troublesome. Moreover, the width of a chain is increased by the width of a leaf spring. Also, in FIGS. 8 and 9 of Japanese reference 55-34580, a torsional coil spring is used to decrease the width of a chain. However, in this case, each connecting pin requires a torsional coil spring, thereby making the structure and the assembly work complicated and troublesome.

The present invention simplifies the structure for restraining chordal oscillation of a chain span of a power transmission chain and simplifies the assembly work of the chain.

SUMMARY OF THE INVENTION

A power transmission chain according to the present invention includes a plurality of links. Each of the links has a pair of pin apertures, which are connected to each other by connecting pins inserted into the pin apertures. At least three adjacent connecting pins have a wire extending substantially along the length of a chain. The wire is engaged with the connecting pins in such a way that bending resistance due to elastic deformation of the wire is applied to the chain during articulation of the chain.

During operation, since the bending resistance due to elastic deformation of the wire is imparted to the chain during articulation of a chain, lateral oscillation of a chain span is controlled thereby restraining chordal oscillation of the chain span. A bending-restraining mechanism is preferably constructed from a wire extending across at least three connecting pins, which eliminates the necessity for providing a respective connecting pin with a bending-restraining mechanism. As a result, the number of components of the chain is reduced, which simplifies both the structure of the chain and the assembly work of the chain.

In one embodiment of the present invention, the wire is disposed in a zigzag pattern at the connecting pins along the length of the chain, and at least one end of the wire is wrapped around the corresponding pin. In this case, the opposite ends of the wire may be wrapped around the corresponding pins.

In another embodiment of the present invention, the wire is disposed in a zigzag pattern at the connecting pins along the length of the chain, and an intermediate portion of the wire is wrapped around the intermediate connecting pin. In this embodiment, a portion of the wire may be wrapped around the connecting pin disposed adjacent to the outermost connecting pin.

BRIEF DESCRIPTION OF THE DRAWINGS

FIG. 4(*b*) is a variation of FIG. 4(*a*).

FIG. 4(*c*) is another variation of FIG. 4(*a*).

FIG. 5(*b*) is a variation of FIG. 5(*a*).

FIG. 5(*c*) is another variation of FIG. 5(*a*).

FIG. 5(*d*) is another variation of FIG. 5(*a*).

FIG. 6(*b*) is a variation of FIG. 6(*a*).

FIG. 6(*c*) is another variation of FIG. 6(*a*).

FIG. 6(*d*) is another variation of FIG. 6(*a*).

DETAILED DESCRIPTION OF THE INVENTION

Figure 1:
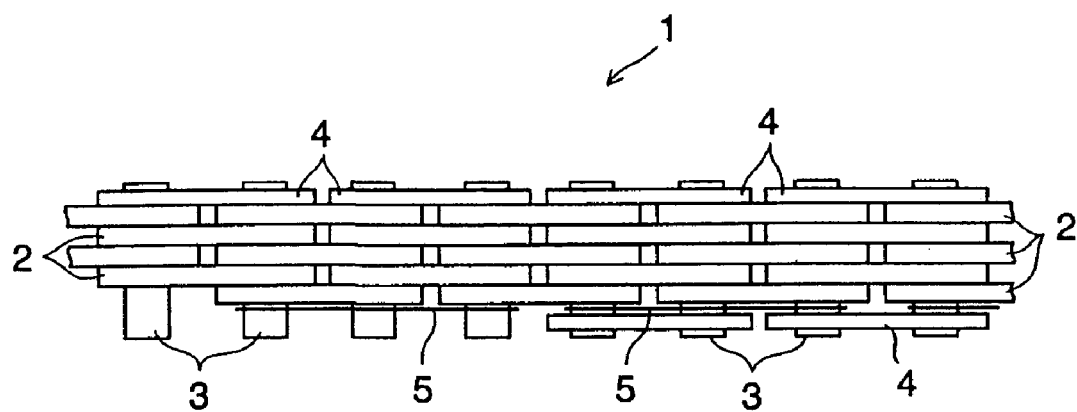
FIG. 1 is a top plan view of a portion of a silent chain according to a first embodiment of the present invention.
Figure 2:
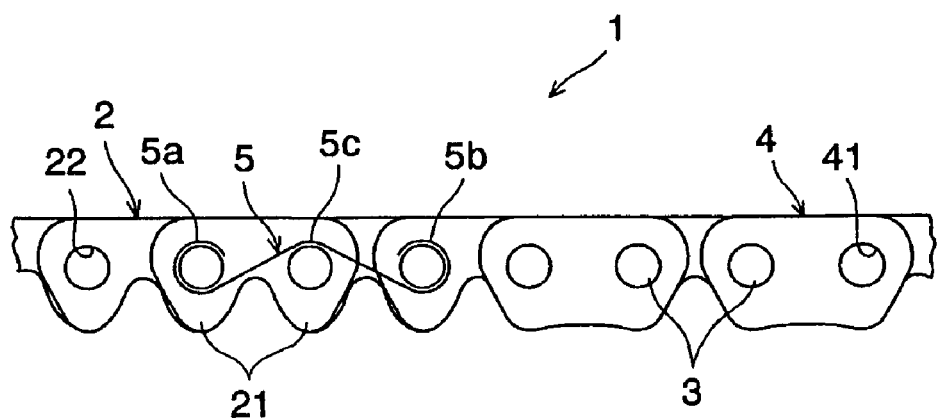
FIG. 2 is a front elevational view of a portion of the silent chain of FIG. 1.
Figure 3:
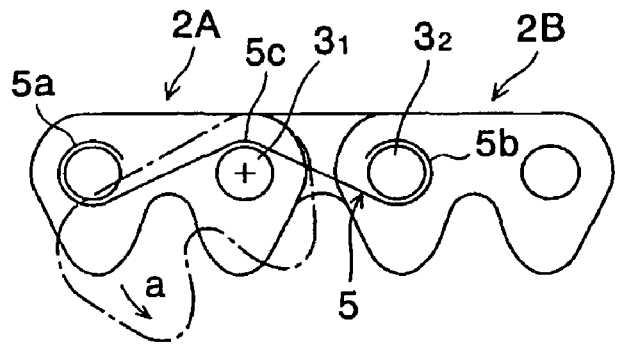
FIG. 3 is an enlarged view of a portion of a silent chain of FIG. 2, illustrating the movement of a wire during articulating motion of links.

FIGS. 1-3 show a first embodiment of the present invention. As shown in FIGS. 1 and 2, a silent chain 1 is constructed from a plurality of rows of interleaved inside links 2, each having a pair of teeth 21 and pin apertures 22, pivotably connected to each other by connecting pins 3 inserted into the pin apertures 22. The silent chain 1 also has outside links 4 disposed outside the outermost inside links 2 and fixedly connected to the ends of the connecting pins 3.

On one side of the chain 1, a wire 5 is provided between the outermost inside link 2 and the outside link 4. The wire 5 is sandwiched between the outermost inside link 2 and the outside link 4 disposed adjacent to each other to prevent the wire from falling out of the chain 1. In a preferred embodiment, the wire 5 is formed of spring steel, preferably piano wire.

In this embodiment, the wire 5 extends across three adjacent connecting pins 3 that are disposed adjacent to each other along the length of the chain 1. Annular hook portions 5a, 5b are formed at opposite ends of the wire 5. The ends of the connecting pins 3 are inserted into the corresponding hook portions 5a, 5b. In other words, each end portion of the wire 5 is wrapped or hooked around the corresponding connecting pin 3. In this case, the hook portions 5a, 5b are not fixedly attached to the corresponding connecting pins 3 so that each connecting pin 3 is freely rotatable relative to the hook portion 5a, 5b. Also, a central portion 5c of the wire 5 is bent in a flat, inverted V-shape, which is engaged with a central connecting pin 3.

In addition, at a linearly extending state of the chain shown in FIGS. 1 and 2, the wire 5 is not elastically deformed and spring force of the wire 5 is not applied to the inside links 2.

The operation of the wire 5 will be explained in accordance with FIG. 3. FIG. 3 shows adjacent inside links 2 (2A, 2B) of FIG. 2 that have a wire 5 disposed thereon. As the inside link 2A rotates around the connecting pin 31 in the direction of an arrow marked a from the state shown in FIG. 3, the wire 5 elastically deforms because one end of the wire 5 is engaged with the connecting pin 32 of the inside link 2B and the intermediate portion of the wire 5 is engaged with the connecting pin 31 from above. Thereby, bending resistance due to bending deformation of the wire 5 is applied to the inside link 2A.

Bending resistance of the wire 5 is imparted to the chain 1 at the time of inwardly articulating motion of the inside link 2A. Thus, chordal oscillation caused by the outward movement of a chain span between the sprockets can be restrained. Also, at the time of engagement with the sprocket, bending resistance is applied to the chain when the inside links articulate in the direction of the engagement with the sprocket. Therefore, the inside links can be restrained from impacting the sprocket teeth during engagement with the sprocket, thereby reducing the impact sound.

Furthermore, a bending-restraining mechanism that can restrain bending of the inside links 2 is constructed from a wire 5 extending across three connecting pins 3, which eliminates the necessity for providing a respective connecting pin with a bending-restraining mechanism. As a result, the structure of the chain and assembly work thereof can be simplified.

Additionally, as the inside link 2A articulates or pivots around the connecting pin 31 in the direction opposite the direction of the arrow marked a, the wire 5 rotates around the connecting pin 32 of the inside link 2B and it will not elastically deform. Therefore, bending resistance will not occur to the inside link 2A.

Figure 4:
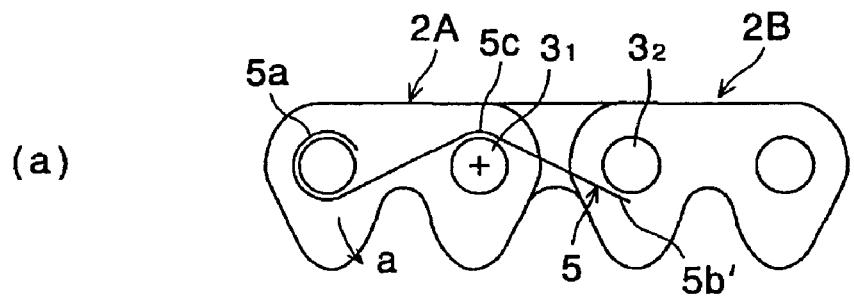
FIG. 4(*a*) is an enlarged view of a portion of a silent chain according to a second embodiment of the present invention, corresponding to FIG. 3 in the first embodiment.
Figure 4:
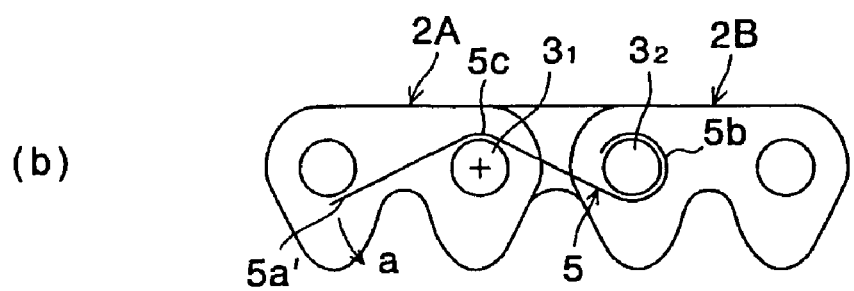
Figure 4:
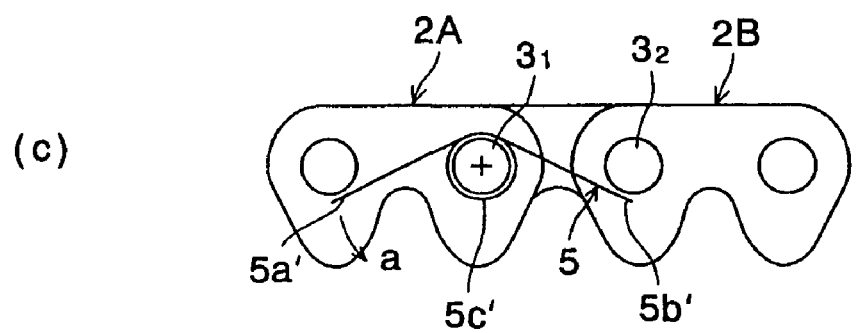

FIG. 4 shows a second embodiment of the present invention. In FIG. 4(a), only one end of the wire 5 is wrapped or hooked around the connecting pin 3 and the other end of the wire 5 extends linearly. A linearly extending end portion 5b' of the wire 5 extends below the connecting pin 32.

In FIG. 4(b), as with FIG. 4(a), only one end of the wire 5 is wrapped or hooked around the connecting pin 3 and the other end of the wire 5 extends linearly. However, in this case, a linearly extending end portion 5a' of the wire 5 extends below the connecting pin 31.

In FIG. 4(c), both of the ends 5a', 5b' of the wire 5 extend linearly without being wrapped around the connecting pin 3.

Also, in this case, a hook portion 5c' is formed at a central portion of the wire 5, which is wrapped around the connecting pin 31.

According to this second embodiment, in any of FIGS. 4(a), (b) and (c), as the inside link 2A rotates around the connecting pin 31 in the direction of an arrow marked a, similar to the first embodiment, the wire 5 elastically deforms because one end of the wire 5 is engaged with the connecting pin 32 of the inside link 2B and the intermediate portion of the wire 5 is engaged with the connecting pin 31. Thereby, bending resistance due to bending deformation of the wire 5 is applied to the inside link 2A.

As with the first embodiment, bending resistance by the wire 5 is imparted to the chain 1 at the time of inwardly articulating motion of the inside link 2A. Thus, chordal oscillation caused by the outward movement of a chain span can be restrained. Also, at the time of engagement with the sprocket, bending resistance is applied to the chain when the inside links articulate in the direction of the engagement with the sprocket. Therefore, the inside links can be restrained from impacting the sprocket teeth during engagement with the sprocket, thereby reducing the impact sound.

Furthermore, a bending-restraining mechanism that can restrain bending of the inside links 2 is constructed from a wire 5 extending across three connecting pins 3, which eliminates the necessity for providing a respective connecting pin with a bending-restraining mechanism. As a result, the structure of the chain and assembly work thereof can be simplified.

Additionally, as the inside link 2A articulates or pivots around the connecting pin 31 in the direction opposite the direction of the arrow marked a, the wire 5 moves away from the connecting pin 32 of the inside link 2B (FIG. 4(a)) or the wire 5 maintains its position (FIGS. 4(b), (c)). Therefore, the wire 5 will not elastically deform. As a result, bending resistance will not occur to the inside link 2A.

Figure 5:
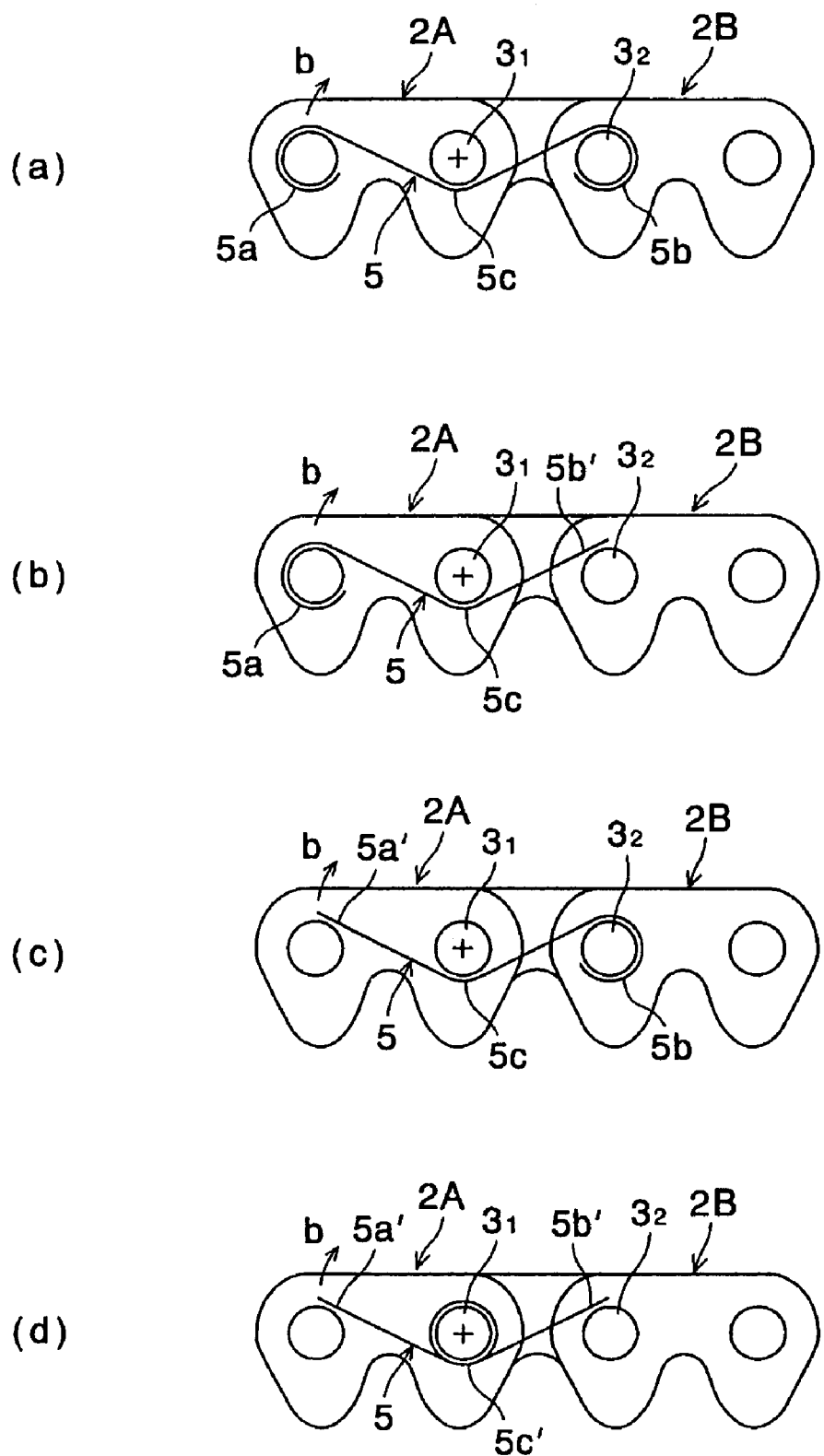
FIG. 5(*a*) is an enlarged view of a portion of a silent chain according to a third embodiment of the present invention, corresponding to FIG. 3 in the first embodiment.

In the first and second embodiments, the central portion of the wire 5 extends over the connecting pin 31 but the present invention is not limited to these embodiments. The central portion of the wire 5 may extend under the connecting pin 31. FIG. 5 shows an example of this embodiment of the present invention. In FIG. 5, the central portion 5c of the wire 5 is bent in a flat, V-shape and engaged with the central connecting pin 3 from below. FIG. 5(a) corresponds to FIG. 3 of the first embodiment and FIGS. 5(b), (c) and (d) correspond to FIGS. 4(a), (b) and (c), respectively.

In FIG. 5(a), annular hook portions 5a, 5b at opposite ends of the wire 5 are wrapped around the corresponding connecting pins 3. As the inside link 2A rotates around the connecting pin 31 in the direction of an arrow marked b from the state shown in FIG. 5 (a), the wire 5 elastically deforms because one end of the wire 5 is engaged with the connecting pin 32 of the inside link 2B and the intermediate portion of the wire 5 is engaged with the connecting pin 31 from below. Thereby, bending resistance due to bending deformation of the wire 5 is applied to the inside link 2A.

Since bending resistance by the wire 5 is imparted to the chain 1 at the time of outwardly articulating motion of the inside link 2A, chordal oscillation caused by the inward movement of a chain span between the sprockets can be restrained.

Additionally, as the inside link 2A articulates or pivots around the connecting pin 31 in the direction opposite the direction of the arrow marked b, the wire 5 rotates around the connecting pin 32 of the inside link 2B and it will not elastically deform. Therefore, bending resistance will not occur to the inside link 2A.

In FIG. 5(b), only one end of the wire 5 is wrapped or hooked around the connecting pin 3 and the other end of the wire 5 extends linearly. That is, a linearly extending end portion 5b' of the wire 5 extends above the connecting pin 32.

In FIG. 5(c), as with FIG. 5(b), only one end of the wire 5 is wrapped or hooked around the connecting pin 3 and the other end of the wire 5 extends linearly. However, in this case, the end portion 5a' extends linearly above the connecting pin 31.

In FIG. 5(d), both ends 5a', 5b' of the wire 5 are not wrapped around the connecting pin 3 and extend linearly. Also, in this case, a hook portion 5c' is formed at a central portion of the wire 5, which is wrapped around the connecting pin 31.

According to the third embodiment, in any of FIGS. 5(a), (b), (c) and (d), as the inside link 2A rotates around the connecting pin 31 in the direction of an arrow marked b, the wire 5 elastically deforms because one end of the wire 5 is engaged with the connecting pin 32 of the inside link 2B and the intermediate portion of the wire 5 is engaged with the connecting pin 31 from below. Thereby, bending resistance due to bending deformation of the wire 5 is applied to the inside link 2A.

Bending resistance by the wire 5 is imparted to the chain 1 at the time of outwardly articulating motion of the inside link 2A. Thus, chordal oscillation caused by the inward movement of a chain span between the sprockets can be restrained.

Additionally, as the inside link 2A articulates or pivots around the connecting pin 31 in the direction opposite the direction of the arrow marked b, the wire 5 rotates around the connecting pin 32 of the inside link 2B (FIG. 5(a)), the wire 5 moves away from the connecting pin 32 of the inside link 2B (FIG. 5(b)), or the wire 5 maintains its position (FIGS. 5(c), (d)) and the wire 5 itself will not elastically deform. Therefore, bending resistance will not occur to the inside link 2A.

Figure 6:
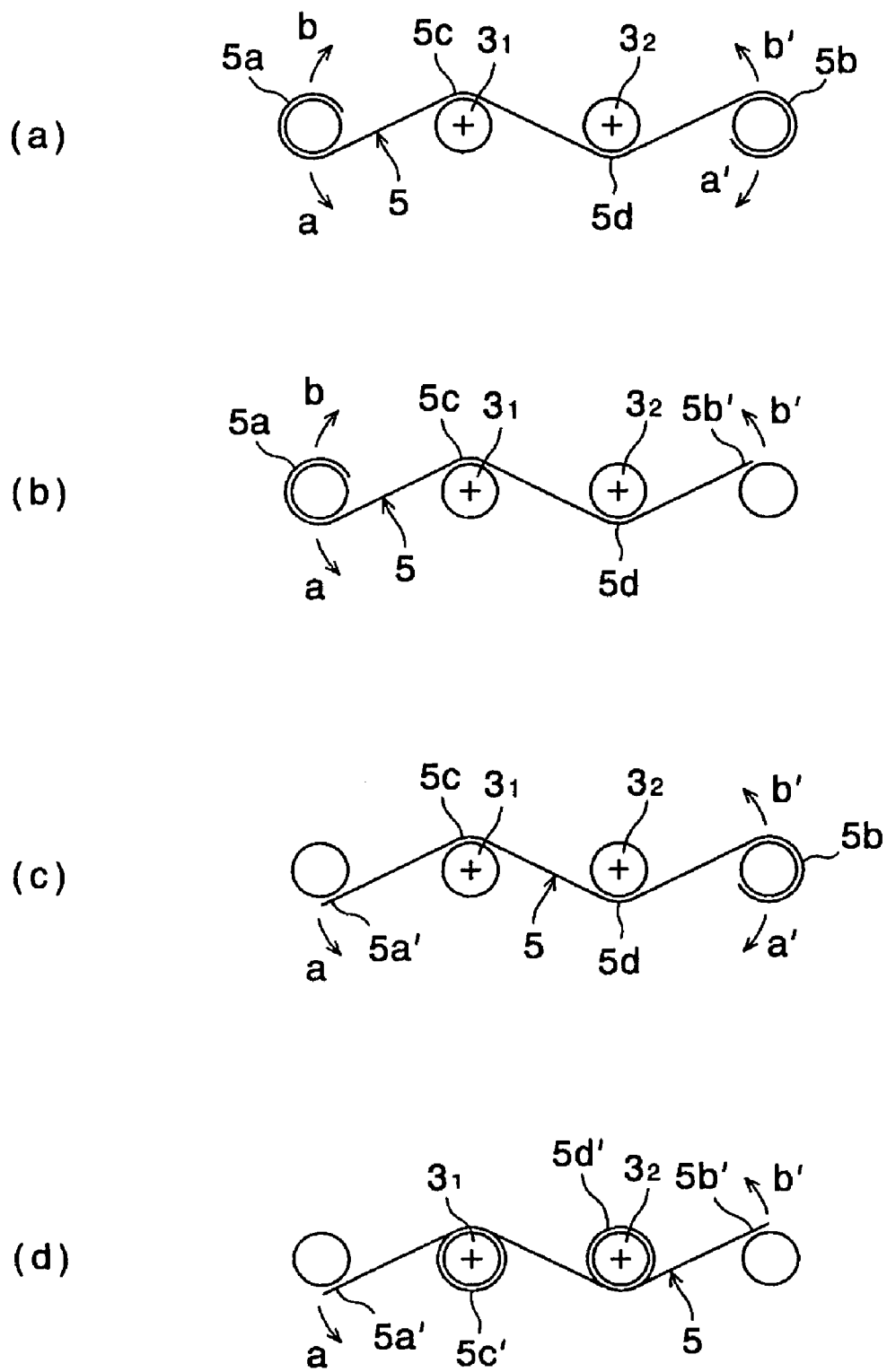
FIG. 6(*a*) is an enlarged view of a portion of a silent chain according to a fourth embodiment of the present invention, corresponding to FIG. 3 in the first embodiment.

In the first three embodiments, a wire spans three connecting pins 3, but the present invention can be applied to a case where a wire spans four or more connecting pins. FIG. 6 shows an example of this alternative embodiment. In FIG. 6, only the connecting pins and the wire are shown and inside flanks are abbreviated for illustration purposes.

In any of FIGS. 6(a) to (d), the intermediate portion 5c of the wire 5 is bent in a flat, inverted V-shape and engaged with the connecting pin 31 from above. The intermediate portion 5d of the wire 5 is bent in a flat, V-shape and engaged with the connecting pin 32 from below. That is, the wire 5 is bent upwardly and downwardly between the connecting pins 3 on the opposite sides and forms a zigzag pattern along the length of the chain. In this state, the wire 5 is not elastically deformed and spring force of the wire 5 is not applied to each inside link.

In FIG. 6(a), opposite end portions of the wire 5 are wrapped around the corresponding connecting pins. In FIG. 6(b), only an end portion 5a of the wire 5 is wrapped or hooked around the connecting pin and the opposite end portion 5b' of the wire is formed linearly and extends above the connecting pin.

In FIG. 6(c), similar to FIG. 6(b), only an end portion 5b of the wire 5 is wrapped or hooked around the connecting pin and the opposite end portion 5a' of the wire 5 is formed linearly and extends below the connecting pin.

In FIG. 6(d), both ends 5a' and 5b' of the wire 5 are formed linearly without being hooked around the connecting pins. Also, hook portions 5c', 5d' are formed at intermediate portions of the wire 5. The hook portion 5c' is wrapped around the connecting pin 31 and the hook portion 5d' is wrapped around the connecting pin 32. A portion of the wire 5 is wrapped around the connecting pin disposed adjacent to the outermost connecting pin.

According to the example shown in FIG. 6(a), when the inside link 2A (see FIG. 3) rotates around the connecting pin 31 in either direction designated by the arrows marked a and b, the wire 5 elastically deforms. Thereby, bending resistance due to bending deformation of the wire 5 is applied to the inside link 2A. Similarly, when the inside link 2B (see FIG. 3) rotates around the connecting pin 32 in either direction designated by the arrows marked a' and b' the wire 5 elastically deforms. Thereby, bending resistance due to bending deformation of the wire 5 is applied to the inside link 2B.

At the time of both inward and outward articulating motions of the inside link 3, bending resistance by the wire 5 is applied to the chain. Thereby, chordal oscillation by both the inward and outward movement of a chain span can be restrained. Also, impact sound can be reduced at the time of engagement with the sprocket.

Moreover, a bending-restraining mechanism to restrain bending of the inside link 2 is formed by the wire 5 that spans four connecting pins 3, thereby further simplifying the structure and assembly work.

According to the example shown in FIG. 6(b), when the inside link 2A (see FIG. 3) rotates around the connecting pin 31 in either direction designated by the arrows marked a and b, the wire 5 elastically deforms. Thereby, bending resistance due to bending deformation of the wire 5 is applied to the inside link 2A. On the other hand, when the inside link 2B (see FIG. 3) rotates around the connecting pin 32 in the direction designated by the arrow marked b', the wire 5 elastically deforms and bending resistance due to bending deformation of the wire 5 is applied to the inside link 2B. However, when the inside link 2B rotates around the connecting pin 32 in the direction opposite the direction designated by the arrow marked b', the wire 5 maintains its position and does not deform.

In FIG. 6(c), when the inside link 2B (see FIG. 3) rotates around the connecting pin 32 in either direction designated by the arrows marked a' and b', the wire 5 elastically deforms. Thereby, bending resistance due to bending deformation of the wire 5 is applied to the inside link 2B. On the other hand, when the inside link 2A (see FIG. 3) rotates around the connecting pin 31 in the direction designated by the arrow marked a, the wire 5 elastically deforms and bending resistance due to bending deformation of the wire 5 is applied to the inside link 2A. However, when the inside link 2A rotates around the connecting pin 31 in the direction opposite the direction designated by the arrow marked a, the wire 5 maintains its position and does not deform.

According to the example shown in FIG. 6(d), when the inside link 2A (see FIG. 3) rotates around the connecting pin 31 in the direction designated by the arrow marked a, the wire 5 elastically deforms. Thereby, bending resistance due to bending deformation of the wire 5 is applied to the inside link 2A. When the inside link 2A rotates around the connecting pin 31 in the direction opposite the direction designated by the arrow marked a, the wire maintains its position and does not deform. On the other hand, when the inside link 2B (see FIG. 3) rotates around the connecting pin 32 in the direction designated by the arrow marked b', the wire 5 elastically deforms and bending resistance due to bending deformation of the wire 5 is applied to the inside link 2B. When the inside link 2B rotates around the connecting pin 32 in the direction opposite the direction designated by the arrow marked b', the wire 5 maintains its position and does not deform.

According to the embodiments shown in FIGS. 6(a) to (d), since bending resistance by the wire 5 is imparted to the chain at the time of inward or outward articulating motion of the inside link, chordal oscillation by the inward or outward movement of a chain span can be restrained. Moreover, a bending-restraining mechanism to restrain bending of the inside link 2 is formed by the wire 5 that spans four connecting pins 3, thereby further simplifying the structure and assembly work.

In the first four embodiments, a wire that has been predeformed in a zigzag pattern is provided around the connecting pins of a chain extended linearly. That is, when the chain is extended linearly the wire is not elastically deformed and thus bending resistance due to elastic deformation of the wire is not applied to the inside link. When the inside link begins to rotate (or articulate) around the connecting pin, bending resistance due to bending deformation of the wire will be applied to the inside link. However, the present invention is not limited to these embodiments.

Figure 7:
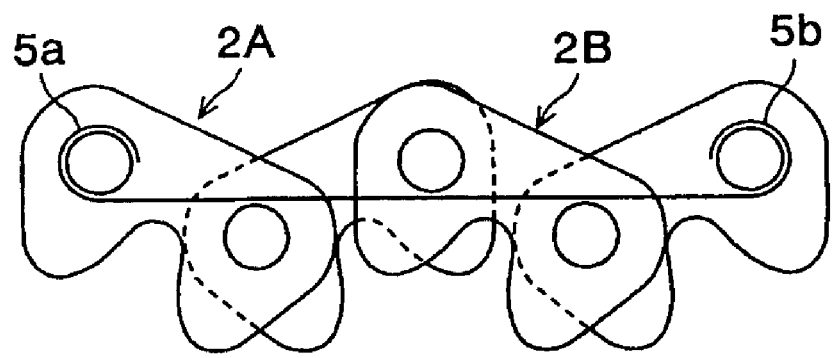
FIG. 7 is an enlarged view of a portion of a silent chain according to a fifth embodiment of the present invention.

FIG. 7 shows a fifth embodiment of the present invention. In this embodiment, a linearly extending wire is engaged with each of five connecting pins. In this embodiment, without tension in the chain the inside links are disposed in a zigzag pattern shown in FIG. 7. When the chain is wrapped around a drive sprocket and a driven sprocket, the wire elastically deforms to impart bending resistance to the inside links.

In this embodiment, since bending resistance by the wire 5 is imparted to the chain during inward or outward articulating motion of the inside link 2, chordal oscillation by the inward or outward movement of the chain span can be restrained. Moreover, a bending-restraining mechanism to restrain bending of the inside link 2 is formed by the wire 5 that spans five connecting pins 3, thereby still further simplifying the structure and assembly work.

In the above-mentioned embodiments, the wire is disposed between the outermost inside link and the adjacent outside link, but the wire may be disposed between the inside links adjacent to each other in a chain width direction. In addition, the present invention can be applied not only to a silent chain but also to a roller chain.

Those skilled in the art to which the invention pertains may make modifications and other embodiments employing the principles of this invention without departing from its spirit or essential characteristics particularly upon considering the foregoing teachings. The described embodiments and examples are to be considered in all respects only as illustrative and not restrictive. The scope of the invention is, therefore, indicated by the appended claims rather than by the foregoing description. Consequently, while the invention has been described with reference to particular embodiments and examples, modifications of structure, sequence, materials and the like would be apparent to those skilled in the art, yet fall within the scope of the invention.

What is claimed is:

1. A power transmission chain comprising:
   a plurality of links, each link having a pair of pin apertures connected to each other by a connecting pin inserted into each of the pin apertures; and
   a bending-restraining mechanism comprising a wire extending substantially along a length of the chain and engaging at least three adjacent connecting pins comprising a first outer pin, a second outer pin, and an inner pin located between the first outer pin and the second outer pin;
   wherein the wire is formed such that:
     the wire elastically deforms when an inside link rotates around the inner pin in a first direction from the linearly extending state, the wire thereby applying a bending resistance to the inside link during articulation of the chain.

2. The power transmission chain of claim 1, wherein the wire is disposed in a zigzag pattern along the length of the chain, and a first end of the wire is wrapped around the first outer pin.

3. The power transmission chain of claim 2, wherein a second end opposite the first end of the wire is wrapped around the second outer pin.

4. The power transmission chain of claim 1, wherein the wire is disposed in a zigzag pattern along the length of the chain, and an intermediate portion of the wire is wrapped around the inner pin.

5. The power transmission chain of claim 4, wherein the inner pin is adjacent to the first outer pin.

6. The power transmission chain of claim 1, wherein a portion of the wire wrapped around at least one connecting pin is not fixedly attached to the connecting pin.

7. The power transmission chain of claim 1, wherein the wire is disposed between the links adjacent to each other in a chain width direction.

8. The power transmission chain of claim 1, wherein the wire is made of spring steel.

9. The power transmission chain of claim 1, wherein the wire is made of piano wire.

10. The power transmission chain of claim 1, wherein each link has a pair of teeth adapted to engage with a plurality of sprocket teeth.

11. The power transmission chain of claim 1, wherein the chain is a silent chain.

12. The power transmission chain of claim 1, wherein the chain is a roller chain.

13. The power transmission chain of claim 1, wherein the first direction is the direction of the engagement of inside links of the chain with the sprocket as the chain articulates.

14. The power transmission chain of claim 1, wherein the wire is formed such that the bending resistance is applied to the chain at a time of outwardly articulating motion of an inside link of the chain such that a chordal oscillation caused by an inward movement of a chain span between the sprockets is restrained.

15. The power transmission chain of claim 1, wherein the wire is formed such that the bending resistance is applied to the chain at a time of inwardly articulating motion of an inside link of the chain such that a chordal oscillation caused by an outward movement of a chain span between the sprockets is restrained.

16. The power transmission chain of claim 1, wherein the wire is formed such that an inside link of the chain is restrained from impacting the sprocket teeth during engagement with the sprocket, thereby reducing an impact sound.

17. The power transmission chain of claim 1, wherein the wire is formed such that the wire elastically deforms when the inside link rotates around the inner pin in a second direction opposite the first direction from the linearly extending state, the wire thereby applying a bending resistance to the inside link during articulation of the chain.

18. The power transmission chain of claim 1, wherein the wire is formed such that no elastic deformation of the wire occurs when the inner pin rotates in a second direction opposite the first direction from the linearly extending state during articulation of the chain.

19. The power transmission chain of claim 1, wherein the wire is formed such that when the chain is wrapped around a drive sprocket and a driven sprocket, the wire elastically deforms to apply the bending resistance to inside links of the chain.

20. The power transmission chain of claim 1, wherein the wire is formed such that no elastic deformation of the wire occurs when the at least three adjacent connecting pins are in a linearly extending state.

\* \* \* \* \*